(12) United States Patent
Noorizadeh

(10) Patent No.: US 11,830,489 B2
(45) Date of Patent: Nov. 28, 2023

(54) SYSTEM AND METHOD FOR SPEECH PROCESSING BASED ON RESPONSE CONTENT

(71) Applicant: Bank of America Corporation, Charlotte, NC (US)

(72) Inventor: Emad Noorizadeh, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 256 days.

(21) Appl. No.: 17/363,702

(22) Filed: Jun. 30, 2021

(65) Prior Publication Data
US 2023/0005476 A1    Jan. 5, 2023

(51) Int. Cl.
*G10L 15/00* (2013.01)
*G10L 15/22* (2006.01)
*G06F 16/93* (2019.01)

(52) U.S. Cl.
CPC ............. *G10L 15/22* (2013.01); *G06F 16/94* (2019.01); *G10L 2015/223* (2013.01); *G10L 2015/227* (2013.01)

(58) Field of Classification Search
CPC ...... G10L 15/22; G10L 15/26; G10L 15/1822
See application file for complete search history.

(56) References Cited

U.S. PATENT DOCUMENTS

| | | |
|---|---|---|
| 9,218,413 B2 | 12/2015 | Skeen et al. |
| 9,419,665 B2 | 8/2016 | Ellis et al. |
| 9,473,637 B1 | 10/2016 | Venkatapathy et al. |
| 9,646,609 B2 | 5/2017 | Naik et al. |
| 9,666,183 B2 | 5/2017 | Visser et al. |
| 9,673,855 B2 | 6/2017 | Branlund et al. |
| 9,697,829 B1 | 7/2017 | Tickner et al. |
| 9,741,336 B2 | 8/2017 | Williams |
| 9,782,131 B2 | 10/2017 | Van Hasselt et al. |
| 9,799,330 B2 | 10/2017 | Nemala et al. |
| 9,846,915 B2 | 12/2017 | Howe et al. |
| 9,911,412 B2 | 3/2018 | Labsk et al. |
| 9,961,443 B2 | 5/2018 | Yen et al. |
| 9,996,079 B2 | 6/2018 | Magy et al. |
| 10,049,663 B2 | 8/2018 | Orr et al. |
| 10,074,354 B2 | 9/2018 | Gauger, Jr. et al. |
| 10,126,828 B2 | 11/2018 | Amento et al. |
| 10,126,889 B2 | 11/2018 | Westhues et al. |
| 10,142,597 B2 | 11/2018 | Siminoff et al. |
| 10,259,390 B2 | 4/2019 | Zhang et al. |
| 10,262,660 B2 | 4/2019 | Zabel et al. |
| 10,319,361 B2 | 6/2019 | Clemow |
| 10,347,248 B2 | 7/2019 | Kennewick et al. |
| 10,354,011 B2 | 7/2019 | Nell et al. |
| 10,357,881 B2 | 7/2019 | Faridi et al. |

(Continued)

*Primary Examiner* — Daniel Abebe

(57) ABSTRACT

A system for determining intent in a voice signal receives a first voice signal that indicates to perform a task. The system sends a first response that comprises a hyperlink associated with a particular webpage used to perform the task. The system receives a second voice signal that indicates whether to access the hyperlink. The system determines intent of the second voice signal by comparing keywords of the second voice signal with keywords of the first response. The system activates the hyperlink in response to determining that the keywords of the second voice signal correspond to the keywords of the first response.

20 Claims, 2 Drawing Sheets

(56) References Cited

U.S. PATENT DOCUMENTS

| | | |
|---|---|---|
| 10,381,016 B2 | 8/2019 | Lee |
| 10,529,332 B2 | 1/2020 | Lemay et al. |
| 10,567,477 B2 | 2/2020 | Sumner et al. |
| 10,595,747 B2 | 3/2020 | Al-Ali et al. |
| 10,614,829 B2 | 4/2020 | Hejna, Jr. |
| 10,699,569 B2 | 6/2020 | Kobayashi et al. |
| 10,701,784 B2 | 6/2020 | Aggarwal et al. |
| 10,706,444 B2 | 7/2020 | Bayer et al. |
| 10,706,873 B2 | 7/2020 | Tsiartas et al. |
| 10,720,059 B2 | 7/2020 | Bartel |
| 10,748,546 B2 | 8/2020 | Kim et al. |
| 10,755,723 B1 | 8/2020 | Scalise et al. |
| 10,809,876 B2 | 10/2020 | Brown et al. |
| 10,839,803 B2 | 11/2020 | Hughes et al. |
| 10,874,346 B1 | 12/2020 | Lisy et al. |
| 10,930,289 B2 | 2/2021 | Rodriguez et al. |
| 10,978,088 B2 | 4/2021 | Short et al. |
| 2014/0188477 A1* | 7/2014 | Zhang .................. G10L 15/22 704/257 |
| 2017/0291027 A1 | 10/2017 | Gordon et al. |
| 2018/0061414 A1 | 3/2018 | Lim |
| 2018/0103360 A1 | 4/2018 | Hinrikus et al. |
| 2018/0204111 A1 | 7/2018 | Zadeh et al. |
| 2019/0057157 A1* | 2/2019 | Mandal .............. G06F 16/9535 |
| 2019/0138180 A1 | 5/2019 | Oh et al. |
| 2019/0167181 A1 | 6/2019 | Jedwab et al. |
| 2020/0312329 A1 | 10/2020 | Mohajer et al. |
| 2021/0076090 A1 | 3/2021 | Aimone et al. |
| 2021/0082412 A1* | 3/2021 | Kennewick ............ G10L 15/26 |
| 2021/0201932 A1* | 7/2021 | Aravamudan ........ G06F 16/433 |
| 2023/0053765 A1* | 2/2023 | He ...................... G10L 15/1815 |

\* cited by examiner

SYSTEM AND METHOD FOR SPEECH PROCESSING BASED ON RESPONSE CONTENT

TECHNICAL FIELD

The present disclosure relates generally to data processing, and more specifically to a system and method for speech processing based on response content.

BACKGROUND

It is technically challenging to determine intent from speech in a conversational messaging environment, such as a messaging environment that uses a conversation agent or "chatbot." This can lead to incorrect responses which waste computing resources and networking bandwidth. Current audio signal processing technologies are not configured to provide a reliable and efficient solution for detecting intent from speech.

SUMMARY

Current conversation agents are not configured to provide a reliable and efficient solution to detect intent from speech. This disclosure contemplates systems and methods for implementing a conversation agent configured to detect intent from speech within the context of the last response shown to a user. In other words, the conversation agent detects the intent of a second speech within the context of the last response generated in response to receiving a first speech. The term "speech" is interchangeably referred to herein as a voice signal or an audio signal.

For example, assume that the conversation agent receives a first speech (i.e., first voice signal) from a user. The user may ask the conversation agent to perform a task. For example, the first speech may include "I want to login to my account" or "login to my account." The conversation agent generates a first response to the first speech. For example, the first response may include a hyperlink that is linked to a particular web site to perform the task. The hyperlink is interchangeably referred to herein as a call-to-action link. In this example, the hyperlink may be represented by text that includes "access account."

In some cases, the user may access the call-to-action link by clicking on the call-to-action link. In such cases, the conversation agent loads the website so that the user may login and access their account.

In other cases, the user may utter a second speech (i.e., second voice signal) that indicates whether to activate the call-to-action link. For example, the second speech may include "Yes, access the account." The conversation agent is configured to determine the intent of the second speech within the context of the first response. For example, the conversation agent may determine whether the second speech contains keywords that correspond to or match keywords in the call-to-action link. In another example, the conversation agent may determine whether utterances in the second speech correspond to or match utterances in the call-to-action link. In another example, the conversation agent may determine whether intent associated with the call-to-action link corresponds to or match the intent of the second speech.

The conversation agent is configured to determine the intent of the second speech within the context of the first response based on a granularity level of the first response. In some cases, the first response may not be annotated with text conveying intent of the first response. In such cases, the conversation agent determines that the granularity level of the first response indicates that the first response is a broad response.

In some cases, the first response may be annotated with text conveying the intent of the first response. For example, the first response may include annotations describing the intent of the first response. In such cases, the conversation agent determines that the granularity level of the first response indicates that the first response is an annotated response.

If the conversation agent determines that the first response is a broad response, the conversation agent may perform keyword and/or utterance analysis to predict the intent of the second speech. For example, the conversation agent may compare keywords and/or utterances of the call-to-action link with keywords and/or utterances of the second speech, respectively.

If the conversation agent determines that the first response is an annotated response, the conversation agent may perform keyword, utterance, and intent analysis to predict the intent of the second speech. For example, the conversation agent may compare keywords, utterances, and intent of the call-to-action link with keywords, utterances, and intent of the second speech, respectively.

In this manner, the disclosed system may reduce the computational, processing, and memory resources, in cases where the first response is a broad response, because since the broad response is not annotated with text conveying the intent of the first response, the conversation agent may only perform keyword and/or utterance analysis. Thus, the disclosed system may reduce the computational, processing, and memory resources that would otherwise be spent using the current conversation agent and speech processing technologies.

In one embodiment, a system for determining intent associated with a voice signal comprises a processor and a memory. The processor receives a first voice signal, where the first voice signal indicates to perform a task. The processor communicates a first response to the first voice signal, where the first response comprises a hyperlink associated with a particular webpage used to perform the task. The processor extracts a first set of keywords from the first response. The processor receives a second voice signal, where the second voice signal indicates access the hyperlink. The processor extracts a second set of keywords from the second voice signal. The processor determine a level of granularity of the first response, where determining the level of granularity of the first response comprises determining whether or not the first response is annotated with text conveying a first intent. In response to determining that the level of granularity of the first response indicates that the first response is not annotated with text conveying the first intent, the processor compares the first set of keywords with the second set of keywords. The processor determines whether the first set of keywords corresponds to the second set of keywords. In response to determining that the first set of keywords corresponds to the second set of keywords, the processor activates the hyperlink to launch the particular webpage to perform the task. The memory is operably coupled with the processor. The memory is operable to store the first voice signal, the second voice signal, and the first response.

The disclosed system provides several practical applications and technical advantages, which include: 1) technology that predicts intent of speech (i.e., second voice signal) with respect to the context of the last response shown to the user (i.e., a first response), where the first response is generated in response to receiving a first speech; 2) technology that predicts the intent of the second speech based on keyword and/or utterance analysis between the keywords and/or utterances in the second speech and the last response, respectively, in response to determining that the last response is not annotated with text conveying intent of the last response; 3) technology that activates a call-to-action link in the first response, in response to determining that keywords and/or utterances in the second speech correspond to keywords and/or utterances in the last response, respectively; 4) technology that detects the intent of the second speech based on keyword, utterance, and intent analysis between the second speech and the last response, in response to determining that the last response is annotated with text conveying the intent of the last response; 5) technology that determines the intent of the second speech by extracting a first set of features from the last response representing a first intent, extracting a second set of features from the second voice signal, comparing the first set of features with the second set of features, and in response to determining that the first set of features corresponds to the first set of features, determining that the intent of the second speech is the first intent; and 6) technology that activates a call-to-action link in the first response, in response to determining that keywords, utterances, and/or the intent of the second speech correspond to keywords, utterances, and/or the intent in the last response, respectively.

As such, the disclosed system may improve the current speech signal processing, conversation agent, and machine-to-human conversation technologies, for example, by predicting intent in an speech with respect the context of the last response show to the user. Accordingly, the disclosed system may be integrated into a practical application of reducing computational complexity of detecting intent in different speeches. For example, by determining whether or not the last response is annotated with text conveying intent of the last response, the disclosed system may determine whether or not to perform intent analysis.

If the last response is not annotated with text conveying intent of the last response, the disclosed system may exclude the intent analysis, and perform keyword and/or utterance analysis. In this case, by excluding the intent analysis, the disclosed system may reduce computational complexity in detecting the intent of the second speech, and thus, reduce the processing and memory resources that would otherwise be spent using the current conversation agent and speech processing technologies.

If the last response is annotated with text conveying intent of the last response, the disclosed system may perform the intent analyses in addition to or instead of the keyword and utterance analysis. For example, the disclosed system may perform the intent analysis by extracting a first set of features from the last response, extracting a second set of features from the second speech, and comparing the first set of features with the second set of features. In this case, by implementing the intent analysis, the disclosed system may increase the accuracy of predicting the intent of the second speech. For example, in some cases, the keywords and utterances of the last response may not correspond to the keywords and utterances of the second speech. Thus, in such cases, relying solely on the keyword and utterance analysis may result in predicting an inaccurate intent of the second speech within the context of the last response. Therefore, in cases that the last response is annotated with text conveying intent of the last response, the disclosed system increases the accuracy in predicting the intent of the second speech by implementing the intent analysis.

The disclosed system may further be integrated into a practical application of recognizing, interpreting, and processing voice signals, e.g., received from a user, and allowing the user of a system that generates textual information (e.g., keywords) to interact with a voice or speech processing system that is configured to receive voice signals as input. Thus, the disclosed system may transform the received voice signal to textual information, e.g., using voice signal processing, natural language processing, etc.

The disclosed system may further be integrated into an additional practical application of creating an improved machine-to-human conversation system that "understands" the intent of speech signals with respect to the context of one or more last responses. For example, the improved machine-to-human conversation system determines whether the user is continuing the same conversation, e.g., in response to determining that the intent of the second speech corresponds to the intent of the one or more last responses. In another example, the improved machine-to-human conversation system determines whether the user is starting a new conversation, e.g., in response to determining that the intent of the second speech does not correspond to the intent of the one or more last responses. In another example, the improved machine-to-human conversation system determines whether the user is asking to revise, update, or override a call-to-action link provided in one of the previous responses.

Similarly, the disclosed system may further be integrated into an additional practical application of creating an improved machine-to-machine conversation (and/or communication) system by implementing a first machine that is configured to predict the intent of a second audio signal, text, or code with respect to the context of one or more previous responses received from a second machine in form of audio signal, text, or code.

The disclosed system may further be integrated into an additional practical application of creating an improved conversation agent that is capable of producing a more seamless conversation with a user based on detecting intent in speech received from the user with respect to the context of one or more previous responses.

The disclosed system may be integrated into an additional practical application of improving underlying operations of computing devices tasked to process a task requested by a user, and perform the task. This, in turn, provides additional practical applications, including ease of use, fewer resources needed, faster implementation and response, and more accurate communication with the conversation agents. For example, using the current speech signal processing and conversation agent technologies, the user may have to have a longer conversation with the conversation agent to convey a particular task to the conversation agent, and because the conversation agent is not configured to "understand" and predict intent from user's speech in the context of one or more previous responses, the conversation agent spends more processor and memory resources compared to the disclosed system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

As described above, previous technologies fail to provide efficient and reliable solutions for intent detection in speech. This disclosure provides various systems and methods for intent detection in speech within the content of the last response shown to a user. In one embodiment, system 100 and method 200 for intent detection in speech within the content of the last response shown to a user are described in FIGS. 1 and 2, respectively.

Example System for Intent Detection in Speech

Figure 1:
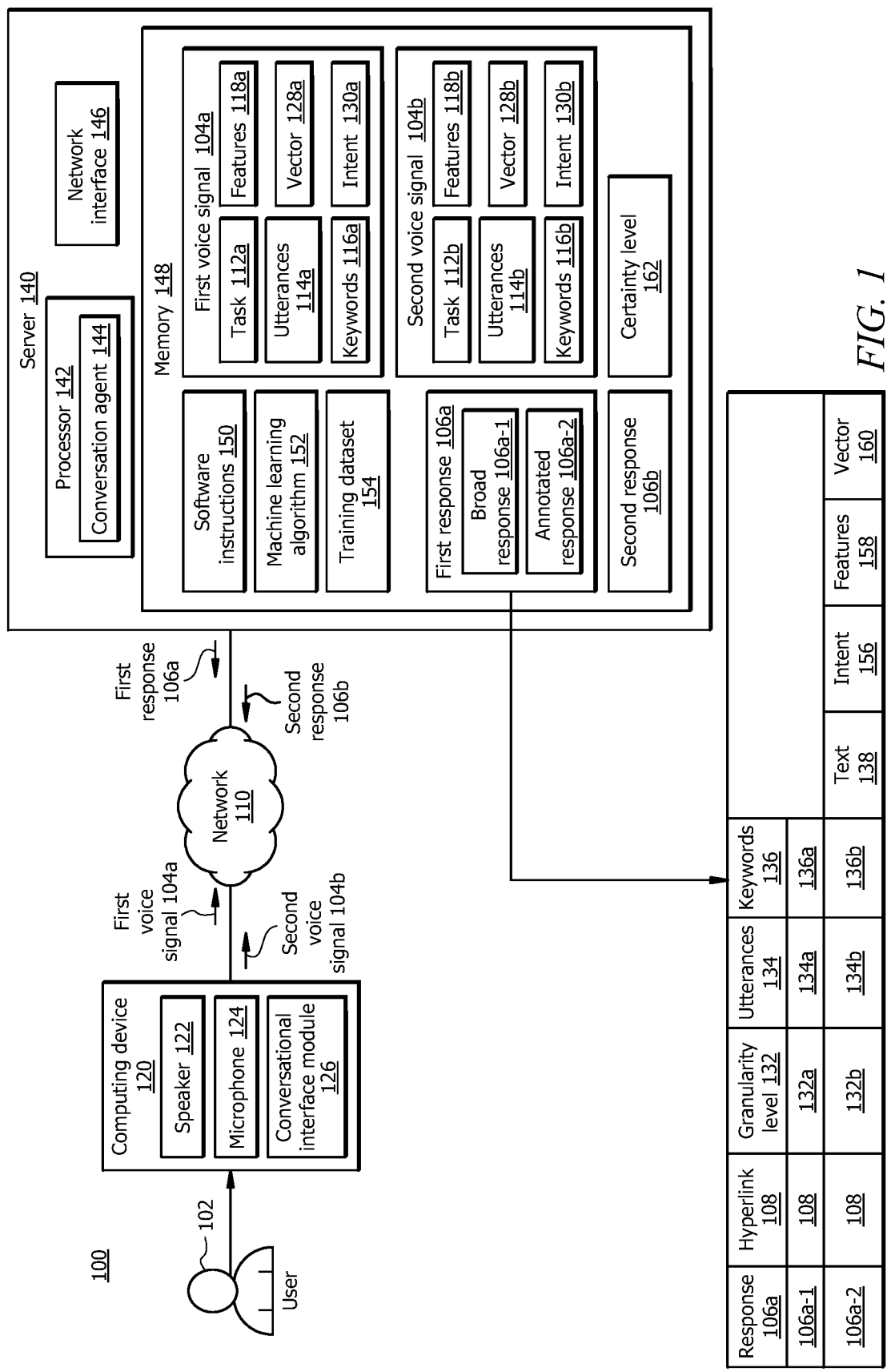
FIG. 1 illustrates an embodiment of a system configured for intent detection in speech.

FIG. 1 illustrates one embodiment of a system 100 that is configured for detecting intent 130 in speech, e.g., intent 130b from a second voice signal 104b, based on a level of granularity 132 associated with a response 106, e.g., the last response 106a generated in response to receiving a first voice signal 104a. In one embodiment, the system 100 comprises a server 140. In some embodiments, system 100 further comprises a network 110 and a computing device 120. Server 140 comprises a processor 142 in signal communication with a memory 148. Memory 148 stores software instructions 150 that when executed by the processor 142, cause the processor 142 to perform one or more functions described herein. For example, when the software instructions 150 are executed, the processor 142 executes a conversation agent 144 to determine intent 130 from a voice signal 104 in the context of the last response 106 based on a level of granularity of the last response 106. In other embodiments, system 100 may not have all of the components listed and/or may have other elements instead of, or in addition to, those listed above.

System Components

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120.

The computing device 120 is associated with or includes a speaker 122, a microphone 124, and a conversational interface module 126. The user 102 can interact or converse with the conversational interface module 126 using the microphone 124. The conversational interface module 126 is configured to respond to the user 102 using the speaker 122.

The conversational interface module 126 may be implemented by a software and/or a hardware processor. The conversational interface module 126 may be executed by the processor of the computing device 120 executing software instruction stored in the memory of the computing device 120. The conversational interface module 126 is in signal communication with the server 140, processor 142, and conversation agent 144, via the network 110. The processor 142 may deploy or install the conversational interface module 126 on the computing device 120 in order to interact with the user 102. For example, the user 102 may converse with the conversational interface module 126 indicating that the user 102 is asking the conversation agent 144 to perform a task 112.

As the user 102 speaks to the microphone 124, the conversational interface module 126 captures voice signals 104, e.g., voice signal 104a and voice signal 104b, that include the speech of the user 102. The conversational interface module 126 forwards the captured voice signal 104 to the conversation agent 144. The conversation agent 144 processes the received voice signal 104 and generates a response 106. For example, the conversation agent 144 receives a first voice signal 104a, processes the first voice signal 104a, and generates a first response 106a to the first voice signal 104a. The conversation agent 144 communicates the first response 106a to the computing device 120. In another example, the conversation agent 144 receives a second voice signal 104b, processes the second voice signal 104b, and generates a second response 106b to the second voice signal 104b.

The conversation agent 144 communicates the second response 106b to the computing device 120. The responses 106 may include audio signals, text, or any other type of data. Upon receiving a response 106, the conversational interface module 126 may utter the response 106 from the microphone 124 and/or display the text within the response 106 (e.g., hyperlink 108 or call-to-action link 108) on a display screen of the computing device 120.

The processes of analyzing the voice signals 104 and generating respective responses 106 are described further below in conjunction with the operational flow of the system 100 and method 200 described in FIG. 2.

Server

Server 140 is generally a server or any other device configured to process data and communicate with computing devices (e.g., computing device 120), databases, etc., via the network 110. The server 140 is generally configured to oversee the operations of the conversation agent 144, as described further below in conjunction with the operational flow of system 100 and method 200 described in FIG. 2.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the conversation agent 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-2. For example, the processor 142 may be configured to perform one or more steps of method 200 as described in FIG. 2.

Network interface 146 is configured to enable wired and/or wireless communications (e.g., via network 110). The network interface 146 is configured to communicate data between the server 140 and other devices (e.g., computing device 120), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the software instructions 150, machine learning algorithm 152, training dataset 154, voice signals 104 a and 104b, responses 106a and 106b, certainty level 162, and/or any other data or instructions. The software instructions 150 may comprise any suitable set of instructions, logic, rules, or code operable to execute the processor 142.

Conversation Agent

Conversation agent 144 may be implemented by the processor 142 executing the software instructions 150, and is generally configured to determine intent 130 from a voice signal 104 based on a granularity level 132 associated with the last response 106 shown to the user 102.

In one embodiment, the conversation agent 144 may be implemented by a machine learning algorithm 152. For example, the machine learning algorithm 152 may comprise support vector machine, neural network, random forest, k-means clustering, etc. The machine learning algorithm 152 may be implemented by a plurality of neural network (NN) layers, Convolutional NN (CNN) layers, Long-Short-Term-Memory (LSTM) layers, Bi-directional LSTM layers, Recurrent NN (RNN) layers, and the like. In another example, the machine learning algorithm 152 may be implemented by Natural Language Processing (NLP). In another example, the machine learning algorithm 152 may be implemented by analog signal processing, digital signal processing, speech signal processing, signal quantization, signal frequency sampling, speech transcription, audio-to-text converter, among others. The operation of the conversation agent 144 is described further below in conjunction with the operational flow of the system 100 and method 200 described in FIG. 2.

In one embodiment, the conversation agent 144 may be trained to detect intent 130 from a voice signal 104 by using the training dataset 154. The training dataset 154 may comprise a plurality of voice signals 104 comprising utterances 114, each labeled with a different intent 130. For example, the training dataset 154 may include a first set of utterances 114 that is labeled with a first intent 130, a second set of utterances 114 that is labeled with a second intent 130, and so on.

In the training process, the conversation agent 144 is given a first set of utterances 114 from the training dataset 154, each labeled with a different intent 130, and is asked to determine correlations and associations between the first set of utterances 114 and their corresponding intent 130. In this process, the conversation agent 144 may implement the machine learning algorithm 152 to extract a first set of features from the first set of utterances 114, and determine that the extracted first set of features are associated with the corresponding intent 130. The first set of features may include one or more keywords representing contextual data including the intent of the first set of utterances 114.

In the testing process, the conversation agent 144 is given a second set of utterances 114 from the training dataset 154 that are not labeled with intent 130, and is asked to predict the intent 130 of the second set of utterances 114. In this process, the conversation agent 144 may implement the machine learning algorithm 152 to extract a second set of features from the second set of utterances 114. The second set of features may include one or more keywords representing contextual data, including the intent of the second set of utterances 114.

The conversation agent 144 compares the second set of features (not labeled with intent) with the first set of features (labeled with a particular intent 130). For example, the conversation agent 144 may compare a first vector representing the first set of features with a second vector representing the second set of features, such as by calculating a dot product, Euclidian distance between the first vector and the second vector, etc. If the conversation agent 144 determines that the Euclidian distance between the first vector and the second vector is less than a threshold distance (e.g., less than 1%, 2%, etc.), the conversation agent 144 determines that the second set of features corresponds to the first set of features. If the conversation agent 144 determines that the second set of features corresponds to the first set of features, the conversation agent 144 determines that the second set of features is also associated with particular intent 130 that the first set of features is associated with, and that the intent of the second set of utterances 114 is the particular intent 130. In this manner, the conversation agent 144 may be trained and tested to detect intent 130 from voice signals 104.

Operational Flow

Receiving a First Voice Signal

The operational flow of the system 100 begins when the conversation agent 144 receives the first voice signal 104a. For example, the conversation agent 144 receives the first voice signal 104a when the user 102 utters speech to the microphone 124, and the conversational interface module 126 transmits the first voice signal 104 to the conversation agent 144. The first voice signal 104a may indicate to perform a task 112a.

The conversation agent 144 processes the first voice signal 104a by implementing the machine learning algorithm 152 to detect the task 112a and intent 130a associated with the first voice signal 104a, similar to that described above. In this process, the conversation agent 144 extracts one or more utterances 114a from the first voice signal 104a by signal quantization, speech transcription, audio-to-text convertor, and/or any audio signal processing.

The conversation agent 144 determines one or more keywords 116a from the first voice signals 104 a using any type of text analysis, such as word segmentation, sentence segmentation, word tokenization, sentence tokenization, and/or the like. The conversation agent 144 may implement the machine learning algorithm 152 to determine the intent 130a associated with the first voice signal 104a. The intent 130a may be represented by one or more keywords including and/or related to keywords 116a. In this process, the conversation agent 144 may extract features 118a from the first voice signal 104a, utterances 114a, and/or keywords 116a. The extracted features 118a may be represented by a vector 128a that comprises a set of numerical values. In this manner, the conversation agent 144 may determine the intent 130a associated with the first voice signal 104a.

Generating a First Response to the First Voice Signal

The conversation agent 144 generates the first response 106a to the first voice signal 104a. In one example, the first response 106a may include a call-to-action link 108. The call-to-action link 108 may be a hyperlink that directs the user 102 to a website to perform the task 112a.

For example, assume that the first voice signal 104a comprises "I want to access my account." The conversation agent 144 generates the first response 106a to the first voice signal 104a. In this example, the first response 106a may include the call-to-action link 108 that is a hyperlink to a particular webpage so that the user 102 may log in and access their account. Upon activation of the call-to-action link 108, the conversation agent 144 launches the particular webpage that is used to perform the task 112a, such that the particular webpage is loaded and displayed on a web browser on the computing device 120. In this example, the call-to-action link 108 may include "access account" hyperlink that directs the user 102 to a particular webpage so that the user 102 may log in and access their account.

Determining a Granularity Level of the First Response

The conversation agent 144 determines a granularity level 132 associate with the first response 106a. In one embodiment, the conversation agent 144 may determine the granularity level 132 associated with the first response 106a by determining whether or not the first response 106a is annotated with text conveying intent 156.

In some cases, the first response 106a may include a broad response 106a-1. The broad response 106a-1 may not be annotated with or include text indicating or describing intent of the broad response 106a-1. In such cases, the conversation agent 144 determines that the granularity level 132a of the broad response 106a-1 is less than a threshold level, e.g., less than 5 out of 10.

In some cases, the first response 106a may include an annotated response 106a-2. The annotated response 106a-2 may be annotated with text 138 indicating or describing intent 156 associated with the annotated response 106a-2. For example, the text 138 may include text describing the intent 156. In the example where the call-to-action link 108 is "access account," the text 138 may include "This link is to view and access an account." In such cases, the conversation agent 144 determines that the granularity level 132b of the annotated response 106a-2 is more than a threshold level, e.g., more than 5 out of 10. The text 138 may or may not accompany an annotated response 106a-2 and thus may or may not be shown to the user 102 when the conversation agent 144 sends the annotated response 106a-2 to the computing device 120.

The conversation agent 144 uses the granularity level 132 associated with the first response 106a to detect intent 130b associated with the second voice signal 104b within the context of the first response 106a, as described below. Continuing the example above, upon generating the first response 106a, the conversation agent 144 sends the first response 106a to the computing device 120 to be displayed on a screen of the computing device 120.

Determining Intent of a Second Voice Signal Based on a Granularity Level of the First Response Upon receiving the first response 106a, the user 102 may utter speech providing the second voice signal 104b. The conversation agent 144 receives the second voice signal 104b via the conversational interface module 126, similar to that described above with respect to receiving the first voice signal 104a. For example, the second voice signal 104b may indicate whether or not to activate the call-to-action link 108 in the first response 106a, i.e., whether or not to perform the task 112b. The second voice signal 104b may indicate to activate, update, or revise the call-to-action link 108.

The conversation agent 144 inputs the second voice signal 104b to the machine learning algorithm 152 to extract utterances 114b, keywords 116b, and features 118b, similar to that described above with respect to extracting utterances 114a, keywords 116a, and features 118a from the first voice signal 104a, respectively. The features 118b are represented by the vector 128b that comprises a set of numerical values. The features 118b may include one or more keywords including and/or related to keywords 116b.

The conversation agent 144 detects the intent 130b based on the granularity level 132 associated with the first response 106a, as described below. In some cases, the conversation agent 144 may detect the intent 130b within the context of one or more previous responses 106 generated before the voice signal 104b.

Determining the Intent of the Second Voice Signal within a Context of a Broad Last Response In a first example, assume that the first response 106a is a broad response 106a-1 whose granularity level 132a is determined to be less than a threshold level, similar to that described above. In this example, the conversation agent 144 determines that the granularity level 132a indicates that the first response 106a-1 is not annotated with text conveying intent of the first response 106a. Thus, the conversation agent 144 may perform keyword and/or utterance analysis to determine the intent 130b of the second voice signal 104b.

In this process, the conversation agent 144 may parse the broad response 106a-1 to detect the utterances 134a and keywords 136a. The conversation agent 144 may then compare the keywords 116b with keywords 136a. The conversation agent 144 may determine whether the keywords 116b correspond to the keywords 136a.

In one embodiment, determining whether the keywords 116b correspond to the keywords 136a comprises determining a percentage of keywords 116b that corresponds to counterpart keywords 136a. For example, if the conversation agent 144 determines that more than 90%, 95%, etc. of the keywords 116b corresponds to counterpart keywords 136a, the conversation agent 144 determines that the keywords 116b correspond to the keywords 136a.

In response to determining that the keywords 116b correspond to the keywords 136a, the conversation agent 144 activates the call-to-action link 108. For example, the conversation agent 144 may activate the call-to-action link 108 by loading a webpage that the call-to-action link 108 is linked to. The conversation agent 144 may send a second response 106b indicating that the call-to-action link 108 is activated.

If the conversation agent 144 determines that the keywords 116b correspond to the keywords 136a, the conversation agent 144 may determine that the second voice signal 104b is related to the broad response 106a-1. In other words, the conversation agent 144 determines that the user 102 is continuing the same conversation.

If the conversation agent 144 determines that the keywords 116b do not correspond to the keywords 136a, the conversation agent 144 determines that the second voice signal 104b is not related to the broad response 106a-1. In other words, the conversation agent 144 may determine that the user 102 is starting a new conversation.

In one embodiment, if the conversation agent 144 determines that the keywords 116b do not correspond to the keywords 136a, the conversation agent 144 may send a second response 106b comprising a second call-to-action link whose keywords correspond to the keywords 116b.

In one embodiment, if the conversation agent 144 determines that the keywords 116b do not correspond to the keywords 136a, the conversation agent 144 may send a second response 106b that is a broad response 106 that is annotated with text conveying intent.

In one embodiment, the conversation agent 144 may compare the utterances 114b with utterances 134a to determine whether the utterances 114b correspond to the utterances 134a, similar to that described above with respect to comparing the keywords 116b with keywords 136a.

If the conversation agent 144 determines that the utterances 114b correspond to the utterances 134a, the conversation agent 144 activates the call-to-action link 108. Otherwise, the conversation agent 144 may not activate the call-to-action link 108.

Determining the Intent of the Second Voice Signal within a Context of an Annotated Last Response In a second example, assume that the first response 106a is an annotated response 106a-2 whose granularity level 132b is determined to be more than a threshold level, similar to that described above. In this example, the conversation agent 144 determines that the granularity level 132b indicates that the first response 106a is annotated with text 138 indicating or describing the intent 156. Thus, the conversation agent 144 may perform keyword, utterance, and intent comparing and analysis to predict or determine the intent 130b of the second voice signal 104b.

In this process, the conversation agent 144 may parse the annotated response 106a-2 to detect keywords 136b and utterances 134b. The conversation agent 144 may also extract features 158 from the annotated response 106a-2, where the features 158 represent the intent 156. The features 158 may be represented by a vector 160 that comprises a set of numerical values.

With respect to keyword analysis, the conversation agent 144 may compare the keywords 136b with keywords 116b. The conversation agent 144 determines whether the keywords 136b correspond to the keywords 116b. In one embodiment, the conversation agent 144 determines that the keywords 136b correspond to the keywords 116b if more than a threshold percentage of the keywords 136b (e.g., more than 90%, 95, etc.) correspond to counterpart keywords 116b or within a threshold range, e.g., within ±5%, ±10%, etc. of the counterpart keywords 116b. In response to determining that the keywords 136b correspond to the keywords 116b, the conversation agent 144 activates the call-to-action link 108, similar to that described above. The conversation agent 144 may send a second response 106b indicating that the call-to-action link 108 is activated. In one embodiment, if the conversation agent 144 determines that the keywords 116b do not correspond to the keywords 136b, the conversation agent 144 may send a second response 106b comprising a second call-to-action link whose keywords correspond to the keywords 116b.

With respect to utterance analysis, the conversation agent 144 may compare the utterances 114b with utterances 134b to determine whether the utterances 114b correspond to the utterances 134b, similar to that described above with respect to comparing the keywords 116b with keywords 136b.

With respect to intent analysis, the conversation agent 144 compare the features 158 with features 118b. In this process, the conversation agent 144 compares the vector 160 that represents the features 158 with the vector 128b that represents the features 118b. The conversation agent 144 determines whether features 158 correspond to features 118b.

To this end, the conversation agent 144 compares each numerical value of the vector 160 with a counterpart numerical value of the vector 128b. The conversation agent 144 determines whether each numerical value of the vector 160 corresponds to the counterpart numerical value of the vector 128b. For example, the conversation agent 144 determines that the features 118b correspond to the features 158 if more than a threshold percentage of the numerical values of the vector 160 (e.g., more than 90%, 95%, etc.) correspond to the counterpart numerical value of the vector 128b. In another example, the conversation agent 144 may determine that the features 118b correspond to the features 158 if more than a threshold percentage of the numerical values of the vector 160 (e.g., more than 90%, 95%, etc.) are within a threshold range (e.g., ±5%, ±10%, etc.) of the counterpart numerical value of the vector 128b.

If the conversation agent 144 determines that the features 118b correspond to the features 158, the conversation agent 144 determines that the intent 156 corresponds to the intent 130b. If the conversation agent 144 determines that the intent 156 corresponds to the intent 130b, the conversation agent 144 may determine that the second voice signal 104b is related to the annotated response 106a-2. In other words, the conversation agent 144 determines that the user 102 is continuing the same conversation. For example, assuming that the second voice signal 104b indicates a confirmation that the call-to-action link 108 is accurate, the conversation agent 144 may proceed to activate the call-to-action link 108.

If the conversation agent 144 determines that the intent 156 does not correspond to the intent 130b, the conversation agent 144 determines that the second voice signal 104b is not related to the annotated response 106a-2. For example, the conversation agent 144 may determine that the call-to-action link 108 is not accurate, and send a second response 106b that includes a second call-to-action link 108 whose intent and/or features correspond to the intent 130b and/or features 118b, respectively. In other words, if the conversation agent 144 determines that the intent 156 does not correspond to the intent 130b, the conversation agent 144 may determine that the user 102 is starting a new conversation.

The conversation agent 144 may determine whether the features 158 correspond to features 118b in other method, described below. For example, the conversation agent 144 may perform a dot product between the vectors 160 and 128*b*. If the dot product between the vectors 160 and 128*b* is less than a threshold percentage, e.g., 1%, 2%, etc., the conversation agent 144 determines that the features 158 correspond to the features 118*b*. In another example, the conversation agent 144 may calculate a Euclidian distance between the vectors 160 and 128*b*. If the Euclidian distance between the vectors 160 and 128*b* is less than a threshold percentage, e.g., 1%, 2%, etc. the conversation agent 144 determines that the features 158 correspond to the features 118*b*.

In one embodiment, the conversation agent 144 may determine a certainty level 162 of activating the call-to-action link 108 based on the granularity level 132 associated with the first response 106*a*. For example, in response to determining that the granularity level 132 of the first response 106*a* indicates that the first response 106*a* is not annotated with text conveying intent of the first response 106*a*, the conversation agent 144 determines that the certainty level 162 of activating the call-to-action link 108 is at a first level, e.g., less than 5 out of 10. In another example, in response to determining that the granularity level 132 of the first response 106*a* indicates that the first response 106*a* is annotated with text conveying intent of the first response 106*a*, the conversation agent 144 determines that the certainty level 162 of activating the call-to-action link 108 is at a second level, e.g., more than 5 out of 10.

Example Method for Intent Detection in Speech

Figure 2:
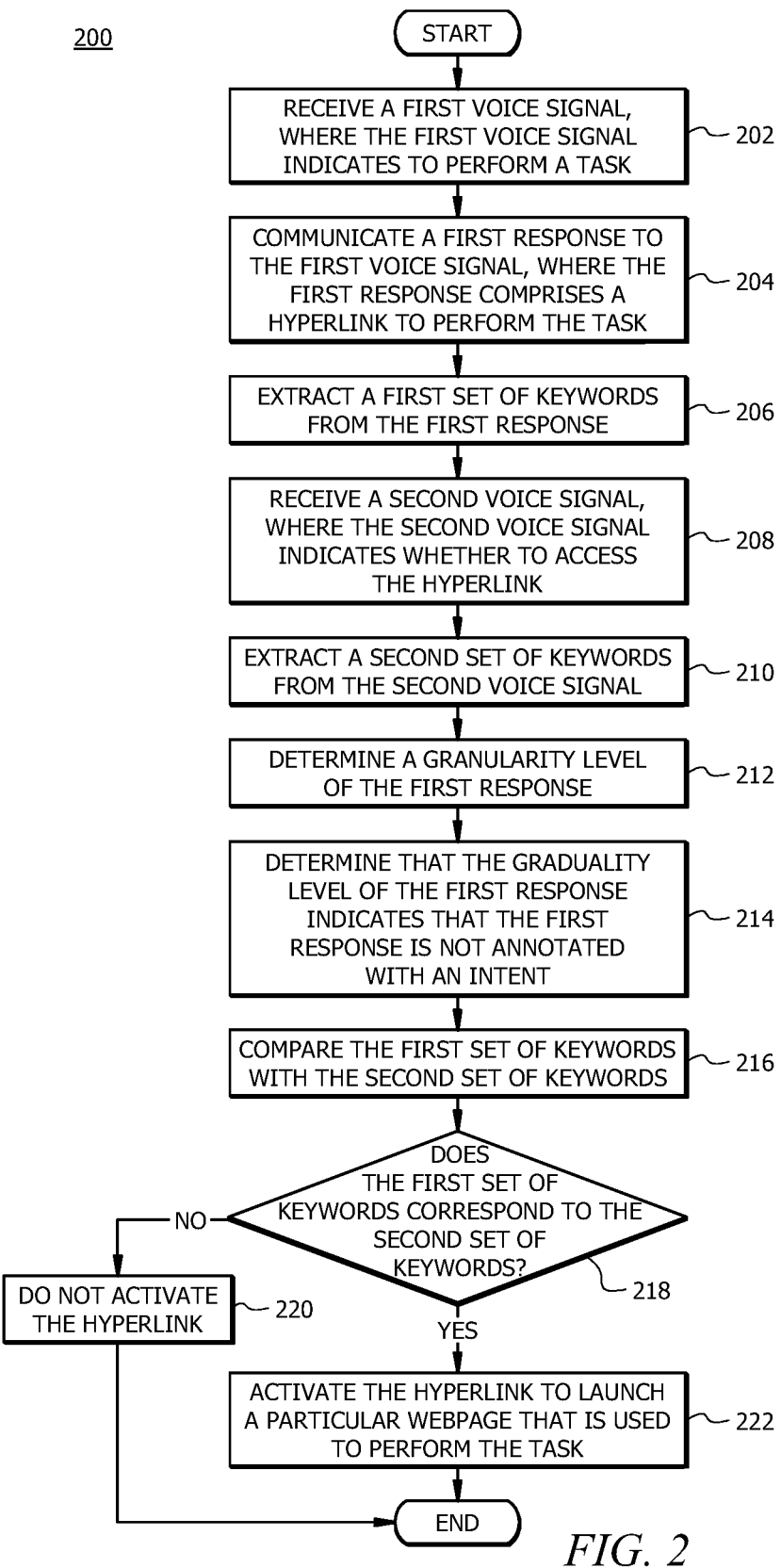
FIG. 2 illustrates an example flowchart of a method for intent detection in speech.

FIG. 2 illustrates an example flowchart of a method 200 for detecting intent 130 in speech, e.g., intent 130*b* from a second voice signal 104*b*, based on a level of granularity 132 associated with a response 106, e.g., the last response 106*a*. Modifications, additions, or omissions may be made to method 200. Method 200 may include more, fewer, or other steps. For example, steps may be performed in parallel or in any suitable order. While at times discussed as the system 100, processor 142, conversation agent 144, or components of any of thereof performing steps, any suitable system or components of the system may perform one or more steps of the method 200. For example, one or more steps of method 200 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 202-222.

The method 200 begins where the conversation agent 144 receives a first voice signal 104*a*, where the first voice signal 104 indicates to perform a task 112*a*. For example, the conversation agent 144 receives the first voice signal 104*a* when the user 102 speaks to the microphone 124 providing the first voice signal 104*a*, similar to that described in FIG. 1. The conversation agent 144 determines the intent 130*a* of the first voice signal 104*a* by feeding the first voice signal 104*a* to the machine learning algorithm 152, similar to that described in FIG. 1.

At step 204, the conversation agent 144 communicates a first response 106*a* to the first voice signal 104*a*, where the first response 106*a* comprises a hyperlink (e.g., the call-to-action link 108) to perform the task 112*a*. For example, the conversation agent 144 generates the first response 106*a* based on the detected intent 130*a*, similar to that described in FIG. 1.

At step 206, the conversation agent 144 extracts a first set of keywords 136 from the first response 106*a*. For example, the conversation agent 144 extracts the first set of keywords 136 by parsing the first response 106*a*. Assuming that the first response 104*a* is a broad response 106*a*-1, the conversation agent 144 extracts keywords 136*a*. Likewise, assuming that the first response 104*a* is an annotated response 106*a*-2, the conversation agent 144 extracts keywords 136*b*.

At step 208, the conversation agent 144 receives a second voice signal 104*b*, where the second voice signal 104*b* indicates whether to access and/or activate the hyperlink (e.g., the call-to-action link 108). For example, the second voice signal 104*b* may indicate whether to access the call-to-action link 108, and upon activation of the call-to-action link 108, the user 102 can perform the task 112*a* indicated in the first voice signal 104*a*.

At step 210, the conversation agent 144 extracts a second set of keywords 116*b* from the second voice signal 104*b*. For example, the conversation agent 144 extracts the second set of keywords 116*b* by feeding the second voice signal 104*b* to the machine learning algorithm 152, similar to that described in FIG. 1.

At step 212, the conversation agent 144 determines a granularity level 132 of the first response 106*a*, e.g. by parsing the first response 106*a*. For example, the conversation agent 144 may determine whether the first response 106*a* is a broad response 106*a*-1 or an annotated response 106*a*-2. The conversation agent 144 determines that the granularity level 132 of the first response 106*a* indicates that the first response 106*a* is a broad response 106*a*-1 if the first response 106*a* is not annotated with text conveying intent. The conversation agent 144 determines that the granularity level 132 of the first response 106*a* indicates that the first response 106*a* is an annotated response 106*a*-2 if the first response 106*a* is annotated with intent 156. Method 200 is directed to a use case where the first response 106*a* is a broad response 106*a*-1, as described below. The other use case where the first response 106*a* is an annotated response 106*a*-2 is described in FIG. 1.

At step 214, the conversation agent 144 determines that the granularity level 132*a* of the first response 104*a* indicates that the first response 104*a* is not annotated with text conveying intent.

At step 216, the conversation agent 144 compares the first set of keywords 136*a* with the second set of keywords 116*b*. For example, the conversation agent 144 may compare each keyword 136*a* with each keyword 116*b* by executing a parsing algorithm.

At step 218, the conversation agent 144 determines whether the first set of keywords 136*a* corresponds to the second set of keywords 116*b*. For example, the conversation agent 144 may determine that the first set of keywords 136*a* corresponds to the second set of keywords 116*b* if more than a threshold percentage of keywords 136*a* (e.g., more than 90%, 95, etc.) correspond to the counterpart keywords 116*b*.

If the conversation agent 144 determines that the first set of keywords 136*a* correspond to the second set of keywords 116*b*, method 200 proceed to step 222. Otherwise, method 200 proceeds to step 220.

At step 220, the conversation agent 144 does not activate the call-to-action link 108. The conversation agent 144 may also send a second response 106*b* asking the user 102 to confirm, revise, or update the call-to-action link 108, task 112*b*, and/or task 112*a*. For example, the conversation agent 144 may send a second response 106*b* that comprises a second call-to-action link whose keywords correspond to the keywords 116*b*, similar to that described in FIG. 1.

At step 222, the conversation agent 144 activates the call-to-action link 108 to launch a particular webpage that is used to perform the task, similar to that described in FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for determining intent associated with a voice signal, comprising:
a processor configured to:
receive a first voice signal, wherein the first voice signal indicates to perform a task;
communicate a first response to the first voice signal, wherein the first response comprises a hyperlink associated with a particular webpage that is used to perform the task;
extract a first set of keywords from the first response;
receive a second voice signal, wherein the second voice signal indicates whether to access the hyperlink;
extract a second set of keywords from the second voice signal;
determine a level of granularity of the first response, wherein determining the level of granularity of the first response comprises determining whether or not the first response is annotated with text conveying a first intent;
in response to determining that the level of granularity of the first response indicates that the first response is not annotated with the text:
compare the first set of keywords with the second set of keywords;
determine whether the first set of keywords corresponds to the second set of keywords; and
in response to determining that the first set of keywords corresponds to the second set of keywords, activate the hyperlink to launch the particular webpage to perform the task; and
a memory, operably coupled with the processor, and operable to store the first voice signal, the second voice signal, and the first response.

2. The system of claim 1, wherein the processor is further configured to:
in response to determining that the level of granularity of the first response indicates that the first response is annotated with the text:
extract a first set of features from the first response, wherein the first set of features represents the first intent;
extract a second set of features from the second voice signal, wherein the second set of features represents a second intent associated with the second voice signal;
compare the first set of features with the second set of features;
determine whether the first set of features corresponds to the second set of features; and
in response to determining that the first set of features corresponds to the second set of features, activate the hyperlink to launch the particular webpage to perform the task.

3. The system of claim 2, wherein:
the first set of features is represented by a first vector comprising a first set of numerical values,
the second set of features is represented by a second vector comparing a second set of numerical values, and
determining whether the first set of features corresponds to the second set of features comprises:
comparing each numerical value of the first vector with a counterpart numerical value of the second vector;
determining whether each numerical value of the first vector corresponds to the counterpart numerical value of the second vector; and
in response to determining that more than a threshold percentage of the first set of numerical values corresponds to the second set of numerical values, determining that the first set of features corresponds to the second set of features.

4. The system of claim 1, wherein determining whether the first set of keywords corresponds to the second set of keywords, comprises:
determining a percentage of keywords of the first set of keywords that matches to counterpart keywords of the second set of keywords;
determining whether the percentage of keywords of the first set of keywords exceeds a threshold percentage; and
in response to determining that the percentage of keywords of the first set of keywords exceeds the threshold percentage, determining that the first set of keywords corresponds to the second set of keywords.

5. The system of claim 1, wherein the processor is further configured to, in response to determining that the first set of keywords does not correspond to the second set of keywords, communicate a second response comprising a second hyperlink whose keywords correspond to the second set of keywords.

6. The system of claim 2, wherein the processor is further configured to, in response to determining that the first set of features does not correspond to the second set of features, communicate a third response comprising a second hyperlink whose features correspond to the second set of features.

7. The system of claim 1, wherein the task comprises accessing an account.

8. A method for determining intent associated with a voice signal, comprising:
receiving a first voice signal, wherein the first voice signal indicates to perform a task;

communicating a first response to the first voice signal, wherein the first response comprises a hyperlink associated with a particular webpage used to perform the task;
extracting a first set of keywords from the first response;
receiving a second voice signal, wherein the second voice signal indicates whether to access the hyperlink;
extracting a second set of keywords from the second voice signal;
determining a level of granularity of the first response, wherein determining the level of granularity of the first response comprises determining whether or not the first response is annotated with text conveying a first intent;
in response to determining that the level of granularity of the first response indicates that the first response is not annotated with the text:
  comparing the first set of keywords with the second set of keywords;
  determining whether the first set of keywords corresponds to the second set of keywords; and
  in response to determining that the first set of keywords corresponds to the second set of keywords, activating the hyperlink to launch the particular webpage to perform the task.

9. The method of claim 8, further comprising:
in response to determining that the level of granularity of the first response indicates that the first response is annotated with the text:
  extracting a first set of features from the first response, wherein the first set of features represents the first intent;
  extracting a second set of features from the second voice signal, wherein the second set of features represents a second intent associated with the second voice signal;
  comparing the first set of features with the second set of features;
  determining whether the first set of features corresponds to the second set of features; and
  in response to determining that the first set of features corresponds to the second set of features, activating the hyperlink to launch the particular webpage to perform the task.

10. The method of claim 9, wherein:
the first set of features is represented by a first vector comprising a first set of numerical values,
the second set of features is represented by a second vector comparing a second set of numerical values, and
determining whether the first set of features corresponds to the second set of features comprises:
  comparing each numerical value of the first vector with a counterpart numerical value of the second vector;
  determining whether each numerical value of the first vector corresponds to the counterpart numerical value of the second vector; and
  in response to determining that more than a threshold percentage of the first set of numerical values corresponds to the second set of numerical values, determining that the first set of features corresponds to the second set of features.

11. The method of claim 8, wherein determining whether the first set of keywords corresponds to the second set of keywords, comprises:
  determining a percentage of keywords of the first set of keywords that matches to counterpart keywords of the second set of keywords;
  determining whether the percentage of keywords of the first set of keywords exceeds a threshold percentage; and
  in response to determining that the percentage of keywords of the first set of keywords exceeds the threshold percentage, determining that the first set of keywords corresponds to the second set of keywords.

12. The method of claim 8, further comprising, in response to determining that the first set of keywords does not correspond to the second set of keywords, communicating a second response comprising a second hyperlink whose keywords correspond to the second set of keywords.

13. The method of claim 9, further comprising, in response to determining that the first set of features does not correspond to the second set of features, communicating a third response comprising a second hyperlink whose features correspond to the second set of features.

14. The method of claim 8, wherein the task comprises accessing an account.

15. A non-transitory computer-readable medium storing instructions that when executed by a processor cause the processor to:
receive a first voice signal, wherein the first voice signal indicates to perform a task;
communicate a first response to the first voice signal, wherein the first response comprises a hyperlink associated with a particular webpage used to perform the task;
extract a first set of keywords from the first response;
receive a second voice signal, wherein the second voice signal indicates whether to access the hyperlink;
extract a second set of keywords from the second voice signal;
determine a level of granularity of the first response, wherein determining the level of granularity of the first response comprises determining whether or not the first response is annotated with text conveying a first intent;
in response to determining that the level of granularity of the first response indicates that the first response is not annotated with the text:
  compare the first set of keywords with the second set of keywords;
  determine whether the first set of keywords corresponds to the second set of keywords; and
  in response to determining that the first set of keywords corresponds to the second set of keywords, activate the hyperlink to launch the particular webpage to perform the task.

16. The non-transitory computer-readable medium of claim 15, wherein the instructions when executed by the processor, further cause the processor to:
in response to determining that the level of granularity of the first response indicates that the first response is annotated with the text:
  extract a first set of features from the first response, wherein the first set of features represents the first intent;
  extract a second set of features from the second voice signal, wherein the second set of features represents a second intent associated with the second voice signal;
  compare the first set of features with the second set of features;
  determine whether the first set of features corresponds to the second set of features; and in response to determining that the first set of features corresponds to the second set of features, activate the hyperlink to launch the particular webpage to perform the task.

17. The non-transitory computer-readable medium of claim 16, wherein:
the first set of features is represented by a first vector comprising a first set of numerical values,
the second set of features is represented by a second vector comparing a second set of numerical values, and
determining whether the first set of features corresponds to the second set of features comprises:
comparing each numerical value of the first vector with a counterpart numerical value of the second vector;
determining whether each numerical value of the first vector corresponds to the counterpart numerical value of the second vector; and
in response to determining that more than a threshold percentage of the first set of numerical values corresponds to the second set of numerical values, determining that the first set of features corresponds to the second set of features.

18. The non-transitory computer-readable medium of claim 15, wherein determining whether the first set of keywords corresponds to the second set of keywords, comprises:
determining a percentage of keywords of the first set of keywords that matches to counterpart keywords of the second set of keywords;
determining whether the percentage of keywords of the first set of keywords exceeds a threshold percentage; and
in response to determining that the percentage of keywords of the first set of keywords exceeds the threshold percentage, determining that the first set of keywords corresponds to the second set of keywords.

19. The non-transitory computer-readable medium of claim 15, wherein the instructions when executed by the processor, further cause the processor to, in response to determining that the first set of keywords does not correspond to the second set of keywords, communicate a second response comprising a second hyperlink whose keywords correspond to the second set of keywords.

20. The non-transitory computer-readable medium of claim 16, wherein the instructions when executed by the processor, further cause the processor to, in response to determining that the first set of features does not correspond to the second set of features, communicate a third response comprising a second hyperlink whose features correspond to the second set of features.

* * * * *